(12) United States Patent
Phillips et al.

(10) Patent No.: US 9,330,022 B2
(45) Date of Patent: May 3, 2016

(54) POWER LOGIC FOR MEMORY ADDRESS CONVERSION

(71) Applicant: Intel Corporation, Santa Clara, CA (US)

(72) Inventors: James E Phillips, Round Rock, TX (US); Wing Shek Wong, Austin, TX (US); Charles Vitu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 13/926,564

(22) Filed: Jun. 25, 2013

(65) Prior Publication Data

US 2014/0380018 A1 Dec. 25, 2014

(51) Int. Cl.
*G06F 12/10* (2006.01)
*G06F 9/30* (2006.01)
*G06F 9/32* (2006.01)

(52) U.S. Cl.
CPC .......... *G06F 12/1036* (2013.01); *G06F 9/3001* (2013.01); *G06F 9/32* (2013.01)

(58) Field of Classification Search
None
See application file for complete search history.

(56) References Cited

U.S. PATENT DOCUMENTS

| 5,680,578 | A | 10/1997 | Dutton et al. | |
|---|---|---|---|---|
| 6,480,874 | B1 | 11/2002 | Aidan et al. | |
| 8,195,919 | B1 * | 6/2012 | Olson et al. | 711/220 |
| 2003/0006806 | A1 * | 1/2003 | Elappuparackal | 327/93 |
| 2004/0123066 | A1 * | 6/2004 | Liron et al. | 711/200 |
| 2005/0210224 | A1 * | 9/2005 | Col et al. | 712/238 |
| 2007/0074012 | A1 * | 3/2007 | Graham et al. | 712/227 |

FOREIGN PATENT DOCUMENTS

WO 2009142671 A1 11/2009

OTHER PUBLICATIONS

European Patent Office, European Search Report on European Patent Application No. EP14171646, mailed Nov. 4, 2014, in European Patent Application No. 14171646.4.

* cited by examiner

*Primary Examiner* — Duc Doan
(74) *Attorney, Agent, or Firm* — Trop, Pruner & Hu, P.C.

(57) ABSTRACT

In an embodiment, a processor includes a plurality of cores. Each core includes conversion power logic to receive an instruction including an untranslated memory address, determine whether a code segment (CS) base address is equal to zero, and in response to a determination that the CS base address is equal to zero, execute the instruction using the untranslated memory address. Other embodiments are described and claimed.

20 Claims, 7 Drawing Sheets

POWER LOGIC FOR MEMORY ADDRESS CONVERSION

TECHNICAL FIELD

Embodiments relate generally to memory management in electronic devices.

BACKGROUND

Typical computer systems include main memory to store programs (sequences of instructions) or data (e.g. program state information). Such main memory is usually volatile, meaning that it requires power to maintain the stored information. For example, a typical type of volatile memory is dynamic random access memory (DRAM). The data stored in main memory is usually accessed by using a memory address.

DETAILED DESCRIPTION

Conventionally, computer processors may use a segmented address scheme to address a memory space. In such a scheme, an effective address is specified relative to a segment location. The effective address is converted into a linear address that corresponds to the physical memory space. For example, the effective address may be converted into a linear address by adding a value based on the segment base address. Such address conversions may be performed using dedicated circuits within the processor.

In accordance with some embodiments, a processor may include conversion power logic. The conversion power logic may include functionality to determine whether an effective address requires conversion to a linear address, and to block the address conversion if it is not required. In this manner, the conversion power logic may reduce the electrical power consumed by the processor. In some embodiments, the conversion power logic may be at least partially implemented using execution components of the processor.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Note that embodiments described herein may be independent of and/or complementary to an operating system (OS)-based mechanism, such as the Advanced Configuration and Power Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 1:
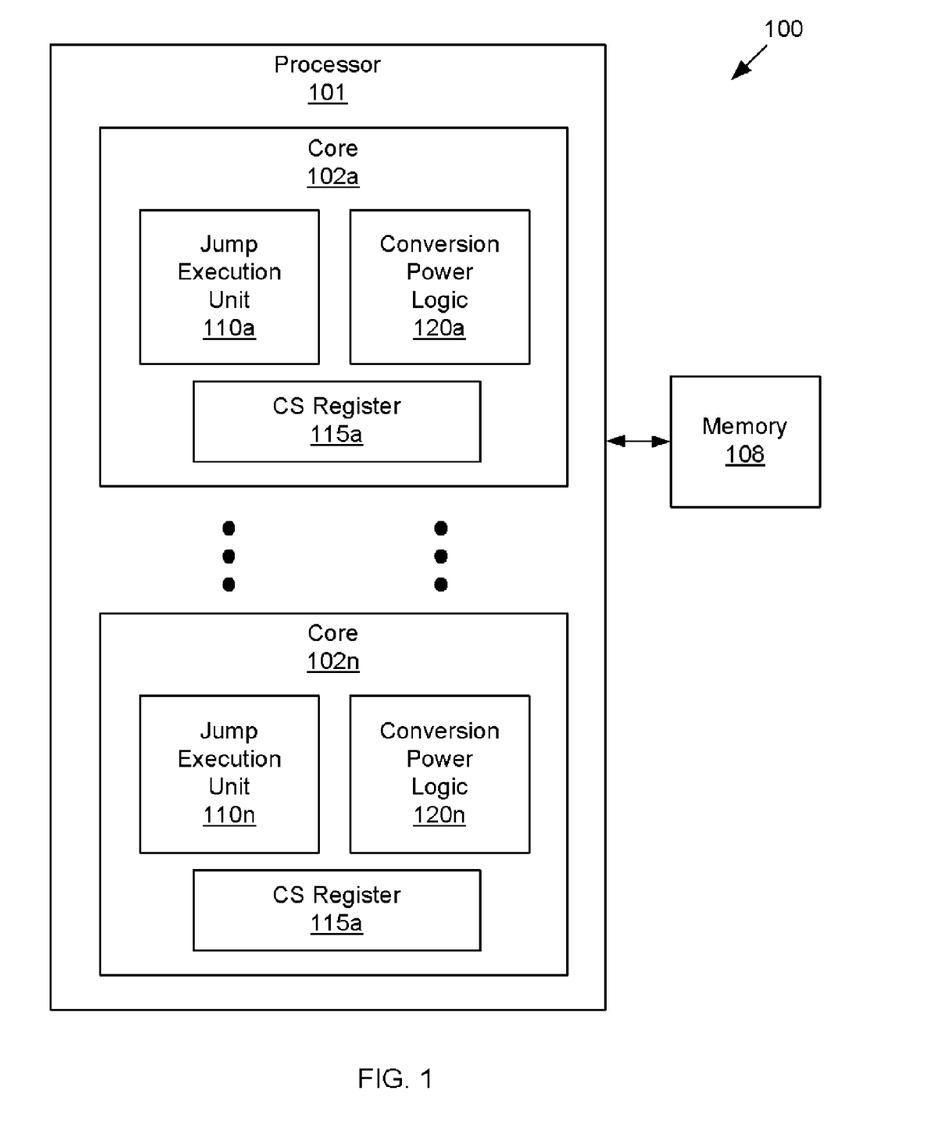
FIG. 1 is a block diagram in accordance with one or more embodiments.

Referring to FIG. 1, shown is a block diagram of a system 100 in accordance with one or more embodiments. In some embodiments, the system 100 may be all or a portion of an electronic device or component. For example, the system 100 may be a cellular telephone, a computer, a server, a network device, a controller, an appliance, etc.

As shown in FIG. 1, the system 100 may include a processor 101 coupled to a memory 108. The memory 108 may be any type of computer memory (e.g., dynamic random access memory (DRAM), static random-access memory (SRAM), etc.).

As shown, in some embodiments, the processor 101 may be a multicore processor including cores 102a-102n. For example, in some embodiments, the cores 102a-102n may be included in multiple tiles within a single die of the processor 101. As shown, in one or more embodiments, each core 102 may include a jump execution unit (JEU) 110, a code segment (CS) register 115, and conversion power logic 120.

In one or more embodiments, the JEU 110 may include functionality to process jump instructions and similar control transfer instructions (e.g., branches, moves, etc.). For example, when processing a jump instruction, the JEU 110 may jump to an out of sequence instruction based on a state of a condition (e.g., true or false). In some embodiments, the destination of the jump may be specified by a target address included in the jump instruction. In some embodiments, the JEU 110 may include functionality for handling mispredicted branches. Further, in some embodiments, the JEU 110 may be included in an integer execution unit (not shown) of the core 102.

In one or more embodiments, the CS register 115 may store a value corresponding to the base address of a current code segment (i.e., a memory segment containing executable instructions). This value may be referred to as the "CS base address." For example, the CS base address stored in the CS register 115 may be used to convert an effective address included in an instruction fetch to a linear address. In some embodiments, the CS base address may have a particular value (e.g., a zero value) when the instruction includes a flat address, and does not require conversion to a linear address.

In one or more embodiments, the conversion power logic 120 may include functionality to determine whether an instruction requires a conversion from effective address to linear address. Further, in some embodiments, the conversion power logic 120 may perform this determination based on whether the value of the CS register 115 is equal to a particular value (e.g., zero). If so, in some embodiments, the conversion power logic 120 may block the address conversion from occurring. The functionality of the conversion power logic 120 is described further below with reference to FIG. 3.

In some embodiments, the conversion power logic 120 may be adapted to any portion or unit of the processor 101 that performs conversions from effective addresses to linear addresses. For example, the conversion power logic 120 may be adapted to a fetch unit, an address generation unit, a jump execution unit (e.g., JEU 110 shown in FIG. 1), etc. An example embodiment of the conversion power logic 120 operating within and/or along with the JEU 110 is described below with reference to FIG. 2.

Figure 2:
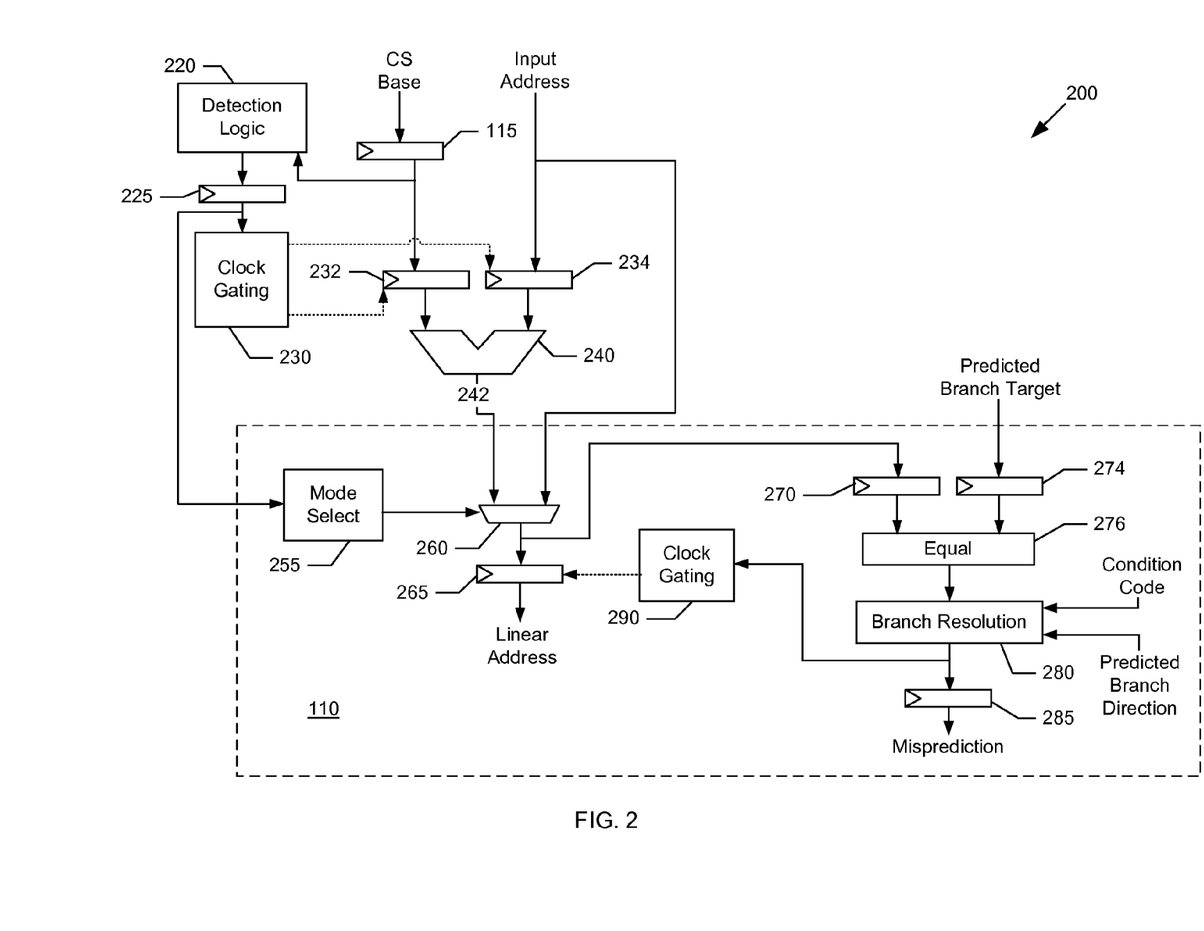
FIG. 2 is a block diagram in accordance with one or more embodiments.

Referring now to FIG. 2, shown is a block diagram 200, which may correspond to an example embodiment of all or a portion of the core 102 shown in FIG. 1. In particular, the example embodiment shown in FIG. 2 may include functionality for handing jump instructions using either effective addresses or linear addresses.

In the situation of a jump instruction using an effective address, the CS base address ("CS Base") is the base address of the code segment associated with the jump instruction. Further, the address associated with the jump instruction ("Input Address") is an effective address, meaning it is defined relative to the CS base address.

As shown, the CS base address may be stored in the CS register 115. The CS base address may be provided from the CS register 115 to detection logic 220 and a first staging latch 232. In some embodiments, the effective address (i.e., the input address included in the jump instruction, in this situation) may be provided to a second staging latch 234.

In one or more embodiments, the detection logic 220 may include functionality to determine whether the CS base address has a value that indicates that the instruction address does not require conversion to a linear address. For example, in some embodiments, the detection logic 220 may detect whether the CS base address has a zero value. Further, if the CS base address has a zero value, the detection logic 220 may provide a positive output value to a detection flip-flop 225. Otherwise, if the CS base address does not have a zero value, the detection logic 220 may provide a negative output value to a detection flip-flop 225. For example, the detection flip-flop 225 may store a "1" value if the CS base address is zero, and may store a "0" value if the CS base address is not zero. Thus, in the situation of a jump instruction using an effective address, the CS base address is not zero, and thus the detection logic 220 provides a negative output value. Note that, while examples of the detection logic 220 and the detection flip-flop 225 are described in terms of "positive," "negative," "1," and "0" values, embodiments are not limited in this regard.

As shown, the detection flip-flop 225 may provide the output value to the clock gating logic 230. In one or more embodiments, the clock gating logic 230 may include functionality to selectively provide a clock signal based on the output value stored in the detection flip-flop 225. Specifically, in response to a negative output value (indicating that the CS base address is not zero), the clock gating logic 230 may provide clock signals to trigger (i.e., latch) the first staging latch 232 and the second staging latch 234. Further, in response to a positive output value (indicating that the CS base address is zero), the clock gating logic 230 may be quiesced, and thus does not provide clock signals to trigger the first staging latch 232 and the second staging latch 234. Note that, in the situation of a jump instruction using an effective address, the detection logic 220 provides a negative output value, and thus the clock gating logic 230 triggers the first staging latch 232 and the second staging latch 234, thereby providing the CS base address and the effective address to an adder 240. Thus, the adder 240 may sum the CS base address and the effective address to obtain a linear address 242. In some embodiments, the adder 240 may be an arithmetic logic unit (ALU).

In one or more embodiments, the input address and the linear address 242 may be provided a multiplexer 260 included in the JEU 110 (indicated by a dotted line). In some embodiments, the multiplexer 260 may be controlled by a mode select logic 255 based on the output value stored in the detection flip-flop 225. For example, in response to a negative output value (indicating that the CS base address is not zero), the mode select logic 255 may cause the multiplexer 260 to output the linear address 242 (received from the adder 240). Further, in response to a positive output value (indicating that the CS base address is zero), the mode select logic 255 may cause the multiplexer 260 to output the input address. Note that, in the situation of an instruction using an effective address, the detection logic 220 provides a negative output value, and thus the multiplexer 260 outputs the linear address 242. As shown, the multiplexer 260 provides the linear address 242 to an output latch 265 and a first input latch 270.

In one or more embodiments, a second input latch 274 may store a predicted branch target. A logic unit 276 may compare the linear address 242 and the predicted branch target. Further, the logic unit 276 may provide a branch resolution logic 280 with an indication of whether the linear address 242 and the predicted branch target are equal. In some embodiments, the branch resolution logic 280 may use this indication, a condition code, and a predicted branch prediction to determine whether a misprediction has occurred. If so, the branch resolution logic 280 may provide a misprediction indication to a misprediction latch 285 and a second clock gating logic 290. In some embodiments, the second clock gating logic 290 may trigger the output latch 265 to provide the linear address.

Turning now to the situation of a jump instruction including a linear address, the CS base address stored in the CS register 115 has a value of zero. Thus, the detection logic 220 may provide a positive output value to a detection flip-flop 225. As explained above, in this situation, the clock gating logic 230 does not provide clock signals to trigger the first staging latch 232 and the second staging latch 234. Therefore, the CS base address and the linear address (i.e., the input address, in this situation) are not provided to the adder 240. Further, when receiving the positive output value, the mode select logic 255 causes the multiplexer 260 to output the received input address. Note that, in such situations, the adder 240 does not perform a conversion from effective address to linear address. Thus, the electrical power that would otherwise be required for this conversion is not consumed. In this manner, the power consumption associated with processing jump instructions may be reduced in some embodiments.

Figure 3:
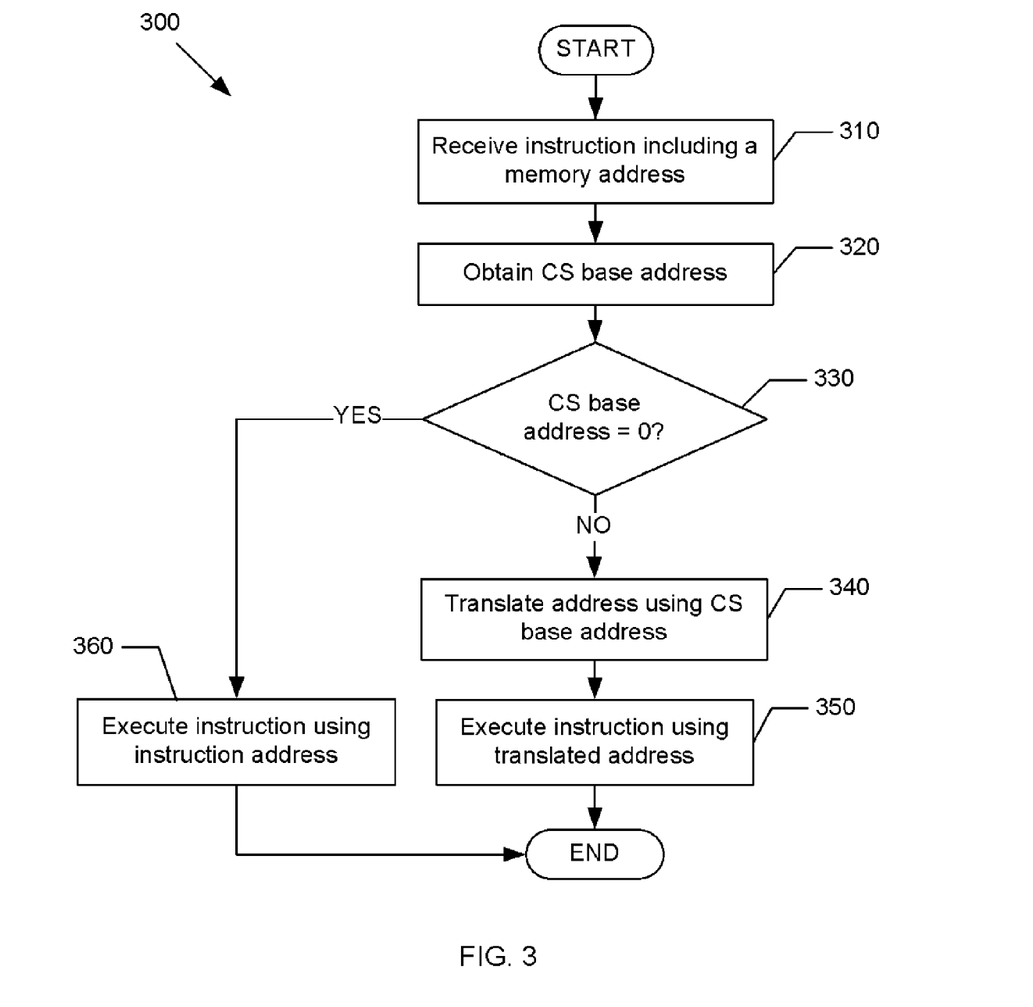
FIG. 3 is a sequence in accordance with one or more embodiments.

Referring now to FIG. 3, shown is a sequence 300 in accordance with one or more embodiments. In one or more embodiments, the sequence 300 may be part of the conversion power logic 120 discussed above with reference to FIG. 1. Further, in the case of a jump instruction, the sequence 300 may be implemented using all or part of the block diagram 200 discussed above with reference to FIG. 2. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, an instruction including a memory address may be received. For example, referring to FIG. 1, the core 102 may receive an instruction including a memory address. In some embodiments, the received instruction may be a jump instruction.

At step 320, a code segment (CS) base address may be obtained. For example, referring to FIG. 2, the detection logic 220 may obtain the CS base address from the CS register 115.

At step 330, a determination is made about whether the CS base address is zero. For example, referring to FIG. 2, the detection logic 220 may determine whether the CS base address (obtained at step 320) has a zero value.

If it is determined at step 330 that the CS base address does not have a zero value, then at step 340, the instruction address (i.e., the memory address included in the instruction received at step 310) may be translated using the CS base address. For example, referring to FIG. 2, when the CS base address is not equal to zero, the detection logic 220 may cause the clock gating logic 230 to trigger the first staging latch 232 and the second staging latch 234, thus providing the CS base address and the instruction address to an adder 240. The adder 240 may sum the CS base address and the instruction address, thereby translating the instruction address into the linear address 242.

At step 350, the instruction (received at step 310) may be executed using the translated address (obtained at step 340). For example, referring to FIG. 2, the mode select logic 255 may cause the multiplexer 260 to output the translated address (i.e., linear address 242) provided by the adder 242. The JEU 110 may then execute the jump instruction using this translated address.

However, if it is determined at step 330 that the that the CS base address has a zero value, then at step 360, the instruction is executed using the instruction address (i.e., the memory address included in the instruction received at step 310). For example, referring to FIG. 2, when the CS base address is equal to zero, the detection logic 220 may cause the clock gating logic 230 to not trigger the first staging latch 232 and the second staging latch 234. Thus, the CS base address and the instruction address are not provided to the adder 240, and the adder 240 does not sum these values. Further, the mode select logic 255 may cause the multiplexer 260 to output the instruction address. The JEU 110 may then execute the jump instruction using the instruction address. After either step 350 or step 360, the sequence 300 ends.

Note that the examples shown in FIGS. 1-3 are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). Further, while shown in FIG. 2 in a particular embodiment adapted to a jump execution unit, embodiments are not limited in this regard. For example, embodiments may be adapted to any portion of a processor including conversion of effective addresses to linear addresses, such as fetch unit, an address generation unit, etc. It is contemplated that specifics in the examples shown in FIGS. 1-3 may be used anywhere in one or more embodiments.

Figure 4:
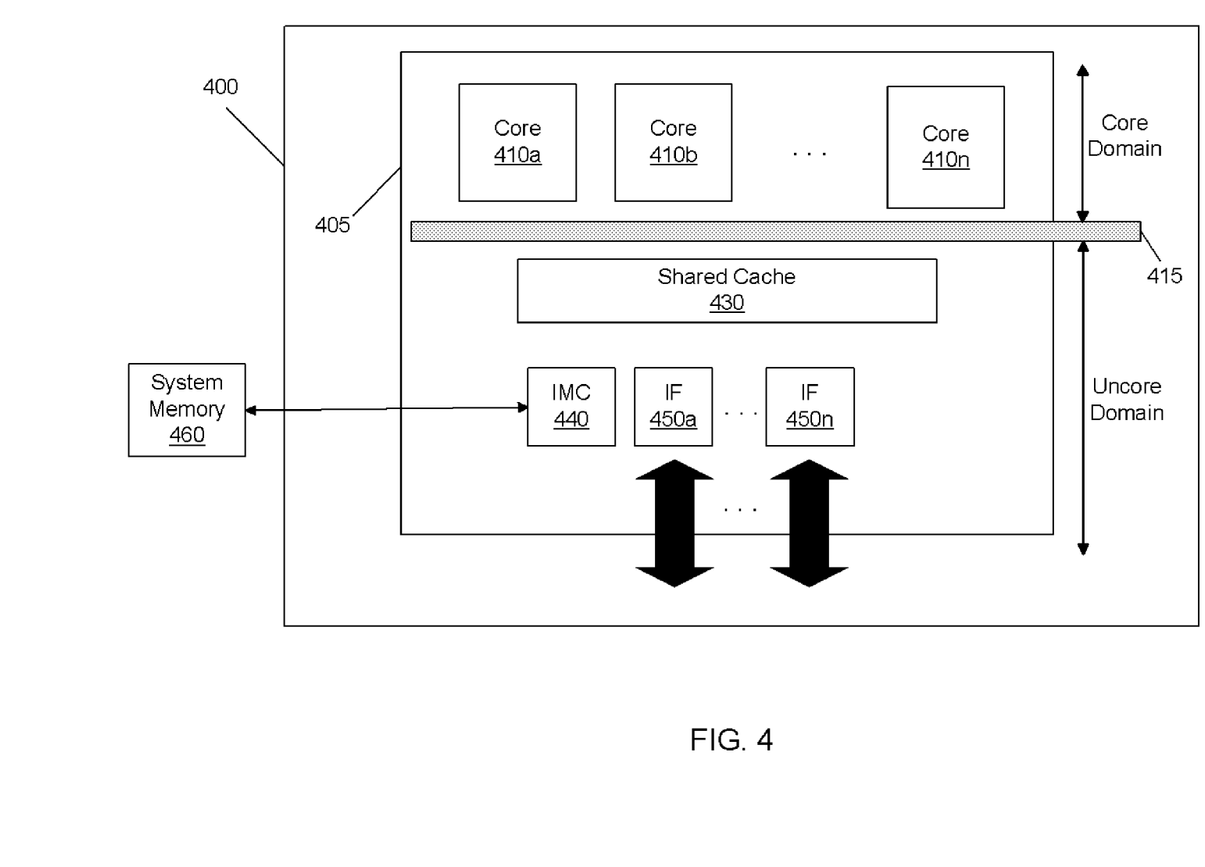
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain that includes various components. As seen, the uncore domain may include a shared cache 430. In addition, the uncore may include an integrated memory controller 440 and various interfaces 450. Although not shown for ease of illustration in FIG. 4, in some embodiments, each of the cores 410a-410n may be associated with the conversion power logic 120 described above with reference to FIGS. 1-3.

With further reference to FIG. 4, the processor 400 may communicate with a system memory 460, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
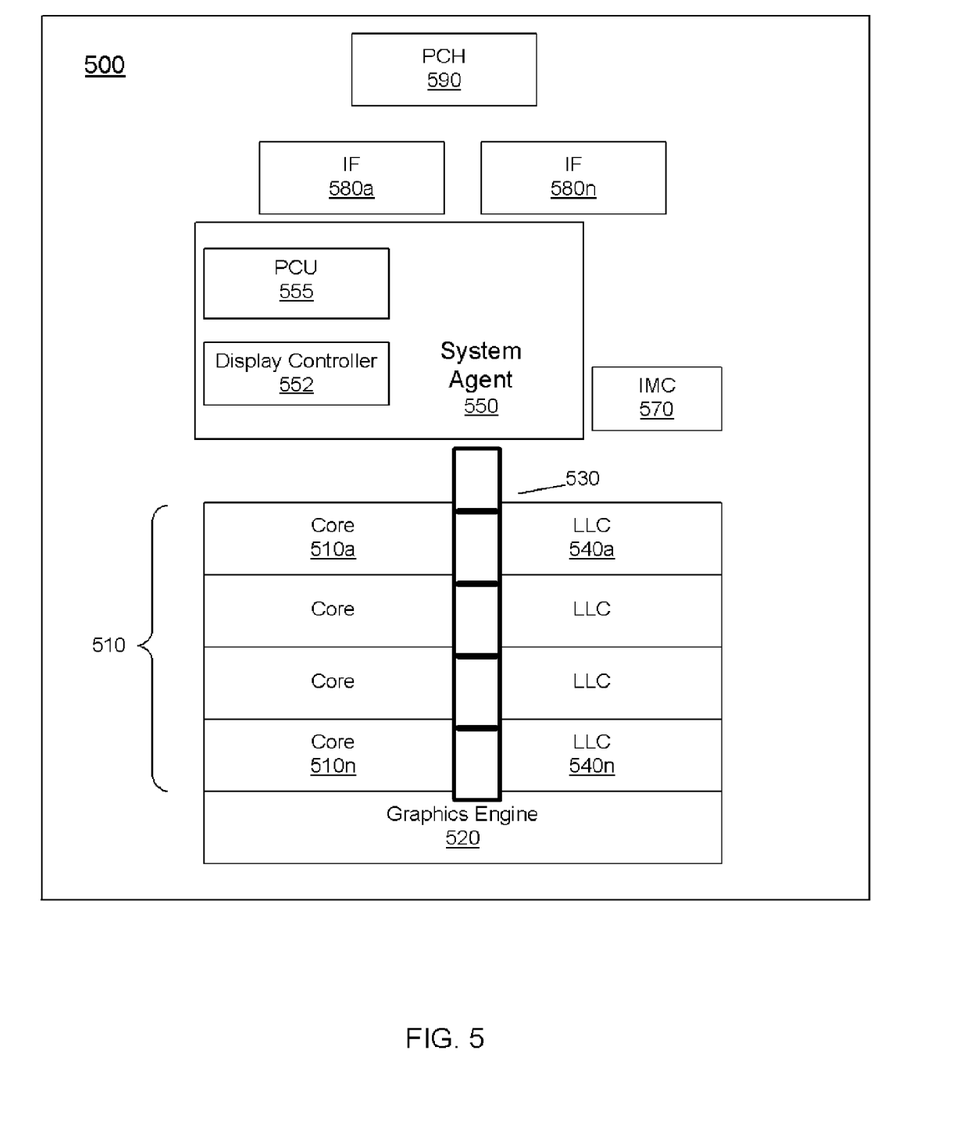
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry.

As seen, a ring interconnect 530 thus couples the cores together, and provides interconnection between the cores, graphics domain 520 and system agent circuitry 550. In the embodiment of FIG. 5, system agent domain 550 may include display controller 552 which may provide control of and an interface to an associated display. As further seen, system agent domain 550 may also include a power control unit 555 to allocate power to the CPU and non-CPU domains. In some embodiments, any of the cores 510a-510n may include some or all of the functionality and/or components of the conversion power logic 120 described above with reference to FIGS. 1-3.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. Although shown at this high level in the embodiment of FIG. 5, understand the scope of the present invention is not limited in this regard.

Figure 6:
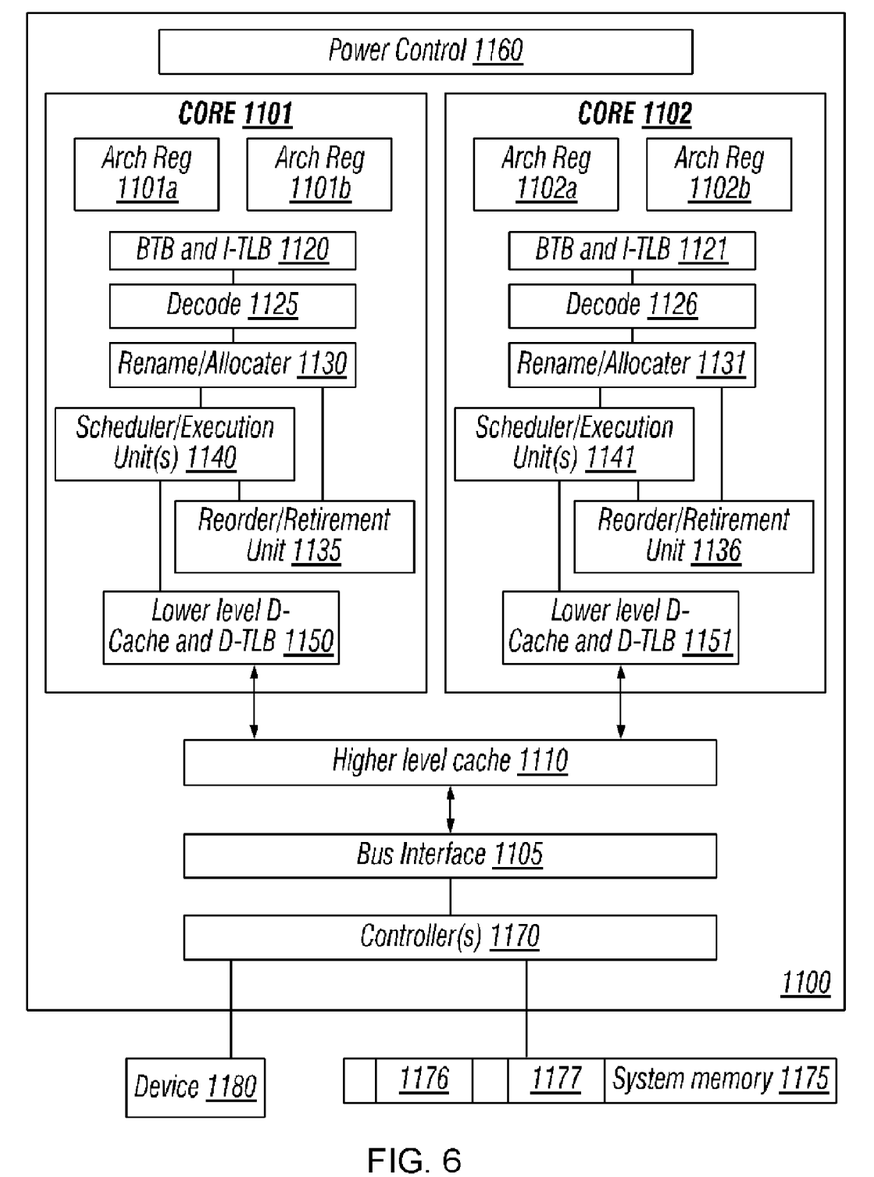
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 may be associated with the conversion power logic 120 described above with reference to FIGS. 1-3.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above.

As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power management in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
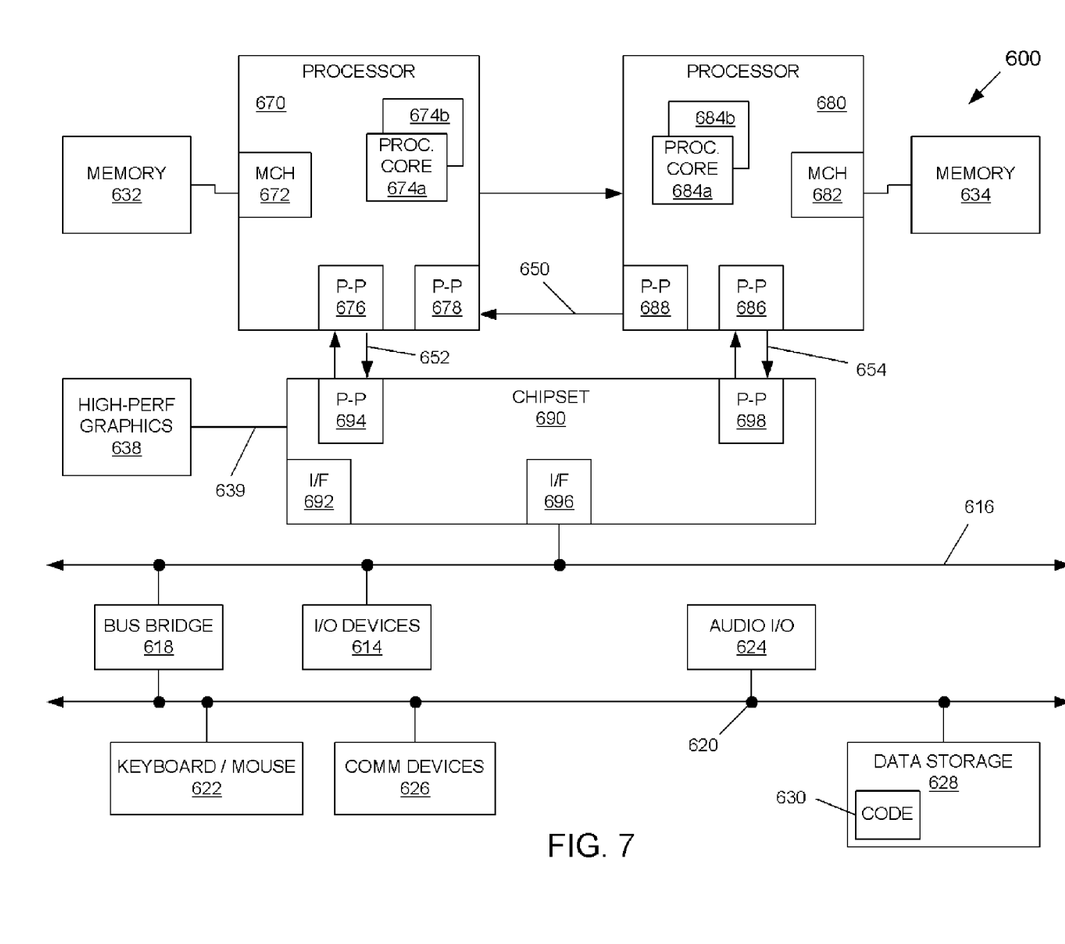
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Although not shown for ease of illustration in FIG. 7, in some embodiments, each of the processor cores 674, 684 may be associated with the conversion power logic 120 described above with reference to FIGS. 1-3.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. In one example embodiment may be a processor including a plurality of cores. Each core may include conversion power logic to receive an instruction including an untranslated memory address, determine whether a code segment (CS) base address is equal to zero, and in response to a determination that the CS base address is equal to zero, execute the instruction using the untranslated memory address.

In an example, the conversion power logic may be further to, in response to a determination that the base address is not equal to zero, sum the untranslated memory address and the CS base address to obtain a translated memory address, and execute the instruction using the translated memory address.

In an example, the received instruction is a jump instruction.

In an example, the processor may include an adder to sum the untranslated memory address and the CS base address. The processor may include a first staging latch to stage the untranslated memory address for input to the adder, and a second staging latch to stage the CS base address for input to the adder. The conversion power logic may be to, in response to the determination that the base address is equal to zero, quiesce the first staging latch and the second staging latch.

In an example, the conversion power logic may be further to, in response to a determination that the base address is not equal to zero, control a multiplexer to output a translated memory address. The conversion power logic is further to, in response to the determination that the base address is equal to zero, control the multiplexer to output the untranslated memory address. The multiplexer is included in a jump execution unit (JEU) of the core.

In an example, the processor may include a CS register to store the CS base address.

In an example, the processor may include detection logic to, in response to receiving the instruction including the untranslated address, determine whether the CS base address is equal to zero.

In another example embodiment may be a system, the system including a processor and a dynamic random access memory (DRAM) coupled to the processor. The processor may include a plurality of cores, each core including a code segment (CS) register to store a CS base address, and detection logic to, in response to receiving a jump instruction including an untranslated address, determine whether the CS base address is equal to a first value, and provide a first output signal when the CS base address is equal to the first value.

In an example, the detection logic may be to provide a second output signal when the CS base address is not equal to the first value, wherein the first value is zero.

In an example, each core may include an adder to, when the detection logic provides the second output signal, sum the untranslated address and the CS base address to obtain a translated address.

In an example, each core may include a multiplexer, and the detection logic may be further to control the multiplexer to output the translated address when the detection logic provides the second output signal.

In an example, the detection logic may be further to control the multiplexer to output the untranslated address when the detection logic provides the first output signal.

In an example, the multiplexer may be included in a jump execution unit (JEU) located in the core.

In another example embodiment may be a method, the method including: receiving, by conversion power logic of a core included in a processor, an instruction including an untranslated memory address; obtaining a code segment (CS) base address using a CS register of the core; determining whether the CS base address has a value of zero; and in response to a determination that the CS base address has the value of zero, providing the untranslated memory address to execute the instruction.

In an example, the method may further include, in response to a determination that the CS base address does not have the value of zero: calculating a translated memory address based on the untranslated memory address and the CS base address; and providing the translated memory address to execute the instruction. In an example, calculating the translated memory address may include summing the untranslated memory address and the CS base address.

In an example, the instruction may be a jump instruction.

In an example, the method may further include, in response to the determination that the CS base address has the value of zero, quiescing one or more staging latches associated with inputs to an arithmetic logic unit (ALU).

In an example, the method may further include, in response to the determination that the CS base address has the value of zero, control a multiplexer to output a translated memory address.

In an example, the method may further include, in response to a determination that the CS base address does not have the value of zero, triggering the one or more staging latches associated with the inputs to the ALU.

In an example, the method may further include, in response to the determination that the CS base address does not have the value of zero, control a multiplexer to output the untranslated memory address.

In another example embodiment may be a communication device may be arranged to perform the method of any of the above examples.

In another example embodiment may be at least one machine readable medium may include a plurality of instructions that in response to being executed on a computing device, cause the computing device to carry out the method of any of the above examples.

In another example embodiment may be an apparatus for processing instructions is configured to perform the method of any of the above examples.

In another example embodiment may be an apparatus comprising means for performing the method of any of the above examples.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores, each core including:
      an integer execution unit including a jump execution unit (JEU); and
      conversion power logic to:
         receive jump instructions executed in the core, each jump instruction including an untranslated memory address;
         for each jump instruction:
            determine whether a code segment (CS) base address is equal to zero; and
            in response to a determination that the CS base address is not equal to zero:
               generate, by an adder of the conversion power logic, a translated memory address using the untranslated memory address;
               provide the translated memory address and the untranslated memory address to a multiplexer included in the JEU of the core; and
               send a first control signal to the multiplexer in the JEU to output the translated memory address, wherein the JEU is to execute the jump instruction using the translated memory address.

2. The processor of claim 1, wherein the conversion power logic is further to, in response to a determination that the base address is equal to zero, sum the untranslated memory address and the CS base address to obtain the translated memory address.

3. The processor of claim 2, wherein the conversion power logic controls the adder to sum the untranslated memory address and the CS base address.

4. The processor of claim 1, wherein the JEU comprises a logic unit and branch resolution logic.

5. The processor of claim 4, wherein the logic unit of the JEU is to provide the branch resolution logic of the JEU with an indication of whether the translated memory address and a predicted branch target are equal.

6. The processor of claim 5, wherein the branch resolution logic of the JEU is to use the indication of whether the translated memory address and a predicted branch target are equal to determine whether a misprediction has occurred.

7. The processor of claim 1, further comprising a first staging latch to stage the untranslated memory address for input to the adder, and a second staging latch to stage the CS base address for input to the adder.

8. The processor of claim 7, wherein the conversion power logic is further to, in response to the determination that the base address is equal to zero, quiesce the first staging latch and the second staging latch.

9. The processor of claim 1, wherein the conversion power logic is further to, in response to the determination that the base address is equal to zero, send a second control signal to control the multiplexer to output the untranslated memory address, wherein the JEU is to execute the jump instruction using the untranslated memory address.

10. A system comprising:
    a processor including a plurality of cores, each core comprising:
       an integer execution unit including a jump execution unit (JEU);
       a code segment (CS) register to store a CS base address;
       conversion power logic to:
          receive jump instructions executed in the core;
          in response to receiving a jump instruction including an untranslated address, determine whether the CS base address is equal to zero;
          provide a first output signal when the CS base address is not equal to zero;
          in response to the first output signal:
             generate, by an adder of the conversion power logic, a translated memory address using the untranslated memory address;
             provide the translated memory address and the untranslated memory address to a multiplexer included in the JEU of the core;
             cause the multiplexer in the JEU to output the translated memory address, wherein the JEU is to execute the jump instruction using the translated memory address; and a dynamic random access memory (DRAM) coupled to the processor.

11. The system of claim 10, wherein the conversion power logic is further to:
provide a second output signal, when the CS base address is equal to zero; and
cause the multiplexer in the JEU to output the untranslated memory address.

12. The system of claim 11, wherein the adder is to:
when the conversion power logic provides the second output signal, sum the untranslated address and the CS base address to obtain a translated address.

13. The system of claim 11, wherein the multiplexer is to output the untranslated address when the detection logic provides the second output signal.

14. The system of claim 10, wherein the JEU comprises a logic unit and branch resolution logic, wherein the logic unit of the JEU is to provide the branch resolution logic of the JEU with an indication of whether the translated memory address and a predicted branch target are equal.

15. The system of claim 14, wherein the branch resolution logic of the JEU is to use the indication of whether the translated memory address and a predicted branch target are equal to determine whether a misprediction has occurred.

16. A method, comprising:
receiving, by conversion power logic of a core included in a processor, a jump instruction executed in the core, the jump instruction including an untranslated memory address;
obtaining a code segment (CS) base address using a CS register of the core;
determining whether the CS base address has a value of zero; and
in response to a determination that the CS base address does not have the value of zero:
generating, by an adder of the conversion power logic, a translated memory address using the untranslated memory address;
providing the translated memory address and the untranslated memory address to a multiplexer included in a jump execution unit (JEU), wherein the JEU is included in an integer execution unit of the core; and
controlling the multiplexer in the JEU to output the translated memory address, wherein the JEU is to use the translated memory address to execute the jump instruction.

17. The method of claim 16, further comprising, in response to a determination that the CS base address does not have the value of zero:
calculating the translated memory address by summing the untranslated memory address and the CS base address.

18. The method of claim 16, wherein the JEU comprises a logic unit and branch resolution logic, wherein the logic unit of the JEU is to provide the branch resolution logic of the JEU with an indication of whether the translated memory address and a predicted branch target are equal.

19. The method of claim 18, wherein the branch resolution logic of the JEU is to use the indication of whether the translated memory address and a predicted branch target are equal to determine whether a misprediction has occurred.

20. The method of claim 16, further comprising, in response to the determination that the CS base address has the value of zero, controlling the multiplexer in the jump execution unit to output the untranslated memory address.

* * * * *